United States Patent [19]  [11]  4,186,178

Oberlander  [45]  Jan. 29, 1980

[54] ALUMINA DISPERSION BEHAVIOR

[75] Inventor: Richard K. Oberlander, Ponca City, Okla.

[73] Assignee: Conoco, Inc., Ponca City, Okla.

[21] Appl. No.: 947,785

[22] Filed: Oct. 2, 1978

[51] Int. Cl.² ............................................. C01F 7/02
[52] U.S. Cl. ............................... 423/265; 23/293 R; 423/625; 423/626
[58] Field of Search ..................... 423/625, 265, 626; 23/293 R

[56] References Cited

U.S. PATENT DOCUMENTS

| | | | |
|---|---|---|---|
| 3,207,578 | 9/1965 | Brown et al. | 423/626 |
| 3,385,663 | 5/1968 | Hughes | 423/626 |
| 3,653,937 | 4/1972 | Koenig | 423/625 |
| 4,117,105 | 9/1978 | Hertzenberg et al. | 423/625 |

*Primary Examiner*—Herbert T. Carter
*Attorney, Agent, or Firm*—Cortlan R. Schupbach, Jr.

[57] ABSTRACT

Alumina slurries are stabilized to prevent thickening and gelling by digesting dried alumina powder in hot water for a time sufficient to stabilize the alumina. The digested alumina is then recovered and dispersed in water containing a small amount of peptizing agent. The slurries so prepared have a low rate of thickening and gelling time is greatly extended.

2 Claims, No Drawings

ALUMINA DISPERSION BEHAVIOR

This invention relates to a method for stabilizing alumina slurries against viscosity increases. More particularly, this invention relates to a method for increasing the life of alumina slurries by pre-treating the alumina with hot water. Alumina slurries are then formed using normal peptizing agents.

Aluminas are utilized commercially, once formed, by placing said aluminas into dispersions or suspensions (called slurries in the art) through the use of peptizing agents such as an acid. Examples of such acids are hydrochloric acid and nitric acid. Once in a suspension or slurry state these aluminas are commercially used in widely varying applications. Some examples of such applications are frictionizing paper surfaces, fiberglass surfaces and metal surfaces. Alumina is also used as anti-static and soil protection agent on wool, nylon, and acrylic carpets. Alumina is used as a dispersion agent in rug shampoos as well as in anti-static and anti-soil agent. Alumina also finds use as binders for vacuum cast alumina silica fibers as a sintering aid and for coating ceramic monoliths for use in auto exhaust catalysts. Usually such aluminas are alpha alumina monohydrate (boehmite) which tend to form more stable colloidal aqueous dispersions with dilute peptizing agents such as acids than do the other aluminas such as alpha-alumina trihydrates. However, all alumina slurries, unless stabilized in some fashion, tend to very rapidly form thick, gellatinous materials (or gels) and thus become unseable for their commercial applications. It is of great importance to maintain a viscosity lifetime of a prepared alumina slurry at the desired level for as long as possible. Factors affecting the useful lifetime of these slurries are acid concentration, the type of acid employed, and the type of alumina employed.

It has been found that as the alumina concentration increases the tendency of the dispersion to gel is also increased. An insufficient amount of peptizing agent will lead to only partial dispersion of the alumina. Increasing the amount of peptizing agent will increase the amount of alumina dispersed such that with an optimum amount of acid nearly all of the alumina will be dispersed and the maximum fluid dispersion life will be obtained before gelling occurs. If the amount of peptizing agent is increased above the optimum point, the fluid life of the dispersion decreases and gelling is accelerated.

The type of peptizing agent also has an effect upon stabilization life. Peptizing agents used are normally monobasic acids such as nitric, hydrochloric, formic, acetic, and so forth. Divalent and trivalent acids lead to non-dispersing flocculents. Generally, dispersions made using the monovalent organic acids have longer fluid life than nitric and hydrochloric acid aluminas. However, the reverse has been found to be true with some boehmite type aluminas.

In addition, small amounts of salts in the dispersion are reported to increase the thickness of boehmite alumina dispersion significantly as set forth in *BAYMAL* ® *Colloidal Alumina,* Section 2, "Physical and Chemical Behavior", DuPont Chemical Co. product brochure. Addition of colloidal silica is reported to reduce the thickening of colloidal aluminas in *Alumina As A Ceramic Material,* American Ceramic Society, 1970, Gitzan, page 113.

It would therefore be of great benefit to provide a simple and effective method for increasing the useful life of alumina slurries. The method provided should be simple, commercially feasible, and provide no by-products to the finished slurry.

It is therefore an object of the instant invention to provide a treatment whereby the useful life of an aluminum slurry can be extended while maintaining slurry and acid concentrations constant. Other objects will become apparent to those skilled in this art as the description proceeds.

It has now been discovered in accordance with the instant invention that stability of alumina slurries can be greatly extended by heating the alumina in water at temperatures of from about 40° C. to about 100° C. for a period of time ranging from about 5 minutes to about 10 hours, removing the treatment water, recovering the alumina, and adding sufficient water and peptizing agent to form the desired finished slurry. This treatment will greatly extend the suspension or slurry life of the alumina.

The alumina should be treated in water at temperatures of from about 40° C. to about 100° C., however temperatures of from about 50° C. to about 100° C. are preferred and temperatures of from about 70° C. to about 100° C. are most preferred. Water useful for pretreating the alumina can be superheated by placing under pressure to form steam and thus while temperatures of above 100° C. are possible, they are not preferred because of the excess energy necessary and more sophisticated processing equipment required.

The alumina to be treated is heated with water at the temperatures described for periods of time ranging from about 5 minutes to about 10 hours. However, times of from about 30 minutes to about 5 hours are preferred and times of from about 1 hour to about 3 hours are most preferred.

The concentration of alumina in the treatment water is not critical. Concentrations ranging from about 5 to about 50% solids can be used as desired for convenience. However, treatment of slurries ranging from about 15 to about 45% solids are preferred and finished slurries of from about 30 to about 50% solids are normal. Of the alumina dispersions tested, alpha-alumina monohydrate is the preferred alumina for slurries and dispersions.

The invention is more concretely described with reference to the examples below wherein all parts and percentages are by weight unless otherwise specified. The examples are provided to illustrate the instant invention and not to limit it.

In the example below, 1500 milliliters of distilled water was heated to a temperature of from 170° to 180° F. To this heated water 250 grams of boehmite-type alumina were added. The mixture was held at temperature for 1 hour with continuous stirring. At the end of the hour stirring was stopped, the alumina was separated from most of the water by decanting, and then filtered on a vacuum filter. The resulting alumina filter-cake was washed on the filter with 500 ml of distilled water at room temperature.

EXAMPLE 1

A dispersion of the alumina treated as described was compared to a dispersion of untreated sample of the precursor alumina. The comparison was carried out as follows:

(A) A 100 gram sample of the precursor alumina containing 73.1 grams $Al_2O_3$ was added to 120.5 ml of distilled water and mixed until the powder was completely wet. To this mixture was added 23.5 ml of acid solution (prepared by diluting 86.4 ml of 70% reagent grade nitric acid to 1 liter with distilled water) while stirring. Immediately after the acid solution was added the mixture began to thicken and became a gel within 1 minute.

(B) The total water content of the alumina cake from hot water treatment was determined. A sample cake containing 73.1 grams $Al_2O_3$ was taken and just enough distilled water was added to make a mixture equivalent to $Al_2O_3$ content to that obtained in (a) above when 100 grams of boehmite alumina were mixed with 120.5 ml of distilled water. To this mixture, while stirring, were added 23.5 ml of the same acid solution as previously used. This dispersion which was still fluid after 7 hours was thus equivalent to that of item (a) in alumina content and acid concentration.

The results of this comparison are shown in Table 1 below.

Table 1

| Time (Min.) | Sample A pH | Sample A Viscosity (cps) | Sample B pH | Sample B Viscosity (cps) |
| --- | --- | --- | --- | --- |
| 10 | −1 | Gel[2] | 4.06 | 27 |
| 60 | | | 4.20 | 41 |
| 120 | | | 4.20 | 78 |
| 180 | | | 4.21 | 191 |
| 240 | | | 4.22 | 782 |
| 300 | | | 4.26 | 3,000 |
| 360 | | | 4.29 | 10,850 |
| 420 | | | 4.36 | 15,600 |

EXAMPLE 2

Samples were prepared as described in Example 1. Treatment times of 1, 2, 6, and 24 hours were given to individual samples using water at temperatures of from 170° to 180° F. The results are shown in Table 2, as viscosity in centipoise.

Table 2

| Water Treatment (hours) | 0 | 1 | 2 | 6 | 24 |
| --- | --- | --- | --- | --- | --- |
| Time (min.) | | | | | |
| 10 | Gel* | 667 | 314 | 178 | 117 |
| 30 | | 597 | 252 | 178 | 133 |
| 60 | | 567 | 265 | 178 | 145 |
| 120 | | 570 | | | |

*Gelled in approximately 1 minute

Samples were prepared as previously described. Treatment temperatures of 150°–160°, 170°–180°, 190°–200°, and (210°) Fahrenheit were used. The results are shown in Table 3 as centipoise.

Table 3

| Water Temperature | Control | 150–160 | 170–180 | 190–200 | 210° |
| --- | --- | --- | --- | --- | --- |
| Time (min.) | | | | | |
| 10 | Gel* | 590 | 314 | 118 | 135 |
| 30 | | 673 | 252 | 118 | 135 |
| 60 | | 820 | 265 | 118 | 142 |
| 120 | | | | 108 | |
| 180 | | | | 110 | |
| 300 | | | | 95 | |
| 1320 | | | | 135 | |

*Gelled in approximately 1 minute

Table 3 shows water treatment temperature to have a significant effect on stabilizing slurry. While effects of such treatment varies with each lot of alumina treated, all slurries were stabilized to great extent. The variations in results from one lot of alumina to another could not be explained, although greatly improved slurry stabilization occurred for all samples tested.

It was also discovered that the hot water treatment improved the acid dispersability of the alumina samples. Alumina samples were dried in a vacuum oven for 24 hours at room temperature before acid dispersability was tested. Sample A was untreated alumina. Sample B was untreated vacuum dried alumina. All other samples were hot water treated under the conditions shown.

Dispersibility was determined by weighing samples of alumina, then stirred into an aqueous acid solution followed by centrifugation of the solution to remove solids. The solids were dried and weighed. The grams dispersible alumina were calculated from the difference between solids and the original sample weight. The percent dispersible alumina was then calculated from the grams dispersible versus original sample weight. Dispersions made were approximately 10% by weight. Test results are shown in Table 4, where all treated samples show increase in dispersibility.

Table 4

| | % $Al_2O_3$ | % Disp. | Change |
| --- | --- | --- | --- |
| Precursor (untreated) | 73.6 | 91.4 | 0 |
| Vacuum Dried (untreated) | 73.8 | 92.1 | +0.7 |
| 1 hour @ 170–180 | 73.2 | 96.3 | +4.9 |
| 2 hours @ 170–180 | 73.4 | 96.0 | +4.6 |
| 4 hours @ 170–180 | 72.8 | 96.2 | +4.9 |
| 6 hours @ 170–180 | 72.9 | 96.6 | +4.5 |
| 24 hours @ 170–180 | 72.9 | 97.7 | +6.3 |
| 2 hours @ 150–160 | 71.9 | 96.5 | +5.1 |
| 2 hours @ 170–180 | 73.4 | 96.0 | +4.4 |
| 2 hours @ 190–200 | 72.7 | 96.8 | +5.4 |
| 2 hours @ 210 | 73.3 | 96.6 | +5.2 |

While certain embodiments and details have been shown for the purpose of illustrating this invention, it will be apparent to those skilled in this art that various changes and modifications may be made herein without departing from the spirit or scope of the invention.

I claim:

1. A method for stabilizing alumina slurries against viscosity increases while improving acid dispersibility comprising slurrying alumina to be stabilized in water, heating said alumina slurry at temperatures of from about 40° C. to about 100° C. for from about 5 minutes to about 10 hours, removing the treatment water and readding water and peptizing agents to form a viscosity stabilized, acid dispersible slurry.

2. A method as described in claim 1 wherein the alumina is alpha alumina monohydrate.

* * * * *